United States Patent
Earnshaw et al.

(10) Patent No.: US 8,644,805 B2
(45) Date of Patent: Feb. 4, 2014

(54) SMART-PHONE ANSWERING SERVICE FOR HANDLING INCOMING CALLS

(75) Inventors: Andrew Mark Earnshaw, Kanata (CA); Jianfeng Weng, Kanata (CA)

(73) Assignee: BlackBerry Limited, Waterloo (CA)

( * ) Notice: Subject to any disclaimer, the term of this patent is extended or adjusted under 35 U.S.C. 154(b) by 32 days.

(21) Appl. No.: 13/407,385

(22) Filed: Feb. 28, 2012

(65) Prior Publication Data

US 2013/0225134 A1 Aug. 29, 2013

(51) Int. Cl.
  *H04M 3/42* (2006.01)
(52) U.S. Cl.
  USPC ............... 455/414.1; 455/418; 455/550.1; 455/552.1; 455/420
(58) Field of Classification Search
  USPC .......... 455/414.1, 413, 417, 418, 420, 445, 455/432.3, 434, 556.2, 557, 550.1, 552.1; 379/211.02, 201.01, 207.15, 225, 198, 379/220.01, 234
  See application file for complete search history.

(56) References Cited

U.S. PATENT DOCUMENTS

| | | | |
|---|---|---|---|
| 5,604,790 | A | 2/1997 | Grimes |
| 6,574,471 | B1 | 6/2003 | Rydbeck |
| 6,718,014 | B2 | 4/2004 | Haim |
| 7,756,531 | B2 | 7/2010 | Aminzadeh |
| 2005/0107066 | A1* | 5/2005 | Erskine et al. ............... 455/405 |
| 2007/0092073 | A1* | 4/2007 | Olshansky et al. ........... 379/232 |
| 2007/0121901 | A1 | 5/2007 | Mathal et al. |
| 2008/0055263 | A1 | 3/2008 | Lemay et al. |
| 2008/0247529 | A1 | 10/2008 | Barton et al. |
| 2009/0086953 | A1* | 4/2009 | Vendrow ................. 379/207.02 |
| 2010/0054442 | A1 | 3/2010 | Wurster et al. |
| 2010/0100387 | A1 | 4/2010 | Kuiken et al. |
| 2011/0034154 | A1 | 2/2011 | Maxfield |
| 2011/0039521 | A1 | 2/2011 | Ustby |

FOREIGN PATENT DOCUMENTS

| | | |
|---|---|---|
| EP | 2071819 A1 | 6/2009 |
| GB | 2407731 A | 5/2005 |
| WO | 2006114480 A1 | 11/2006 |

OTHER PUBLICATIONS

AOL HELP http://help.aol.com/help/microsites/microsite.do?cmd=display/KC&docType=kc&externalId=217929; retrieved Sep. 6, 2011.
Mobile Receptionist http://www.themobileblog.in/2010/07/16/handle-incoming-calls-sms-and-email-notifications-with-mobile-receptionist/; Jul. 16, 2010.
How to: Reject Calls via SMS http://www.smartphonedaily.co.uk/tips-tutorials/how-to-reject-calls-via-sms/; Jul. 29, 2011.

(Continued)

*Primary Examiner* — Jean Gelin
(74) *Attorney, Agent, or Firm* — Novak Druce Connolly Bove + Quigg LLP (57) ABSTRACT

An electronic device capable of receiving and sending calls is configured with at least two modes. When a call is received by a device in a normal mode, the device displays information and presents selectable options for handling the received call. When the device is in a restricted or meeting mode, the device provides authorized callers with the option of prompting the called party to immediately answer the call or to record a message for later retrieval or take other appropriate action. Settings associated with the normal mode and settings associated with the meeting mode are adjustable.

15 Claims, 5 Drawing Sheets

(56) References Cited

OTHER PUBLICATIONS

Incoming Call Plus BETA http://www.appbrain.com/app/incoming-call-plus-beta/com.smitten.incomingplus; retrieved Sep. 6, 2011.
iPhone Tweak: Reject/ Decline http://techzoom.org/iphone-tweak-reject-decline-calls-via-i-am-busy-sms; Jun. 24, 2011.
Mobile Gate http://www.funkyspacemonkey.com/mobilegate-block-incoming-calls-sms-messages-iphone; Feb. 12, 2009.
Extended European Search report mailed Sep. 13, 2012, in corresponding European patent application No. 12157357.0.

\* cited by examiner

SMART-PHONE ANSWERING SERVICE FOR HANDLING INCOMING CALLS

FIELD OF TECHNOLOGY

This disclosure relates generally to managing calls on a smart-phone, and more specifically, to a system and method of providing adjustable means for treating urgent calls.

BACKGROUND

Smart-phones are prevalent in today's world and, despite the ongoing incorporation of additional functions, are a significant means by which phone calls are sent and received wirelessly. Sometimes, a user of a smart-phone is in a setting in which he or she may prefer to not receive calls. For example, a smart-phone user could be in a meeting or a smart-phone user might be in a crowded location where she does not wish to disturb others. Nevertheless, such a smart-phone user may still wish to receive calls which she would consider "important," as will be discussed in greater detail herein. Exemplary embodiments within this disclosure define options by which a smart-phone user can manage calls according to their importance or urgency.

BRIEF DESCRIPTION OF THE DRAWINGS

In order to describe the manner in which the features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Exemplary embodiments within this disclosure enable an electronic device, such as a smart-phone for example, to be set to at least a normal mode and a meeting mode. When a device is in a normal mode the device can immediately prompt a user to take action with respect to a received call. When a device is placed in a meeting mode, incoming calls can be managed differently, such as by inquiring of the caller whether the call is urgent. The caller can be enabled to make an indication that the call is urgent at which point the device can prompt the called party (i.e., the device-user or callee) to answer the call or take other appropriate action. Various embodiments of the disclosure are discussed in detail below. While specific implementations are discussed, it should be understood that this is done for illustration purposes only. A person skilled in the relevant art will recognize that other components and configurations may be used without parting from the scope of the disclosure.

The term "electronic device" is defined as any device that is capable of at least accepting data, transmitting data, and executing commands. For example, electronic devices can include, but are not limited to, portable communications devices, mobile communications devices, mobile computers, smart-phones, computing pads, tablet computers, personal computers, desktop computers, laptop computers, netbooks, set-top phones, or other computing devices capable of at least accepting data, transmitting data, including and executing commands. Data includes, but is not limited to, voice data.

The term "normal mode" means a selected or default mode of operation of an electronic device in which all unblocked calls are forwarded to the device for appropriate action. The terms "meeting mode" and "restricted mode" mean a mode of operation of an electronic device in which selected callers calling the device can bypass voice mail and prompt the called device to respond immediately, and in which non-selected callers calling the device are diverted directly to voice mail. The term "message" is defined as auditory or text information. The term "selectable command-image" is defined as an image, picture or text which is displayed on the display of a device and which is selectable for actuation.

Figure 1:
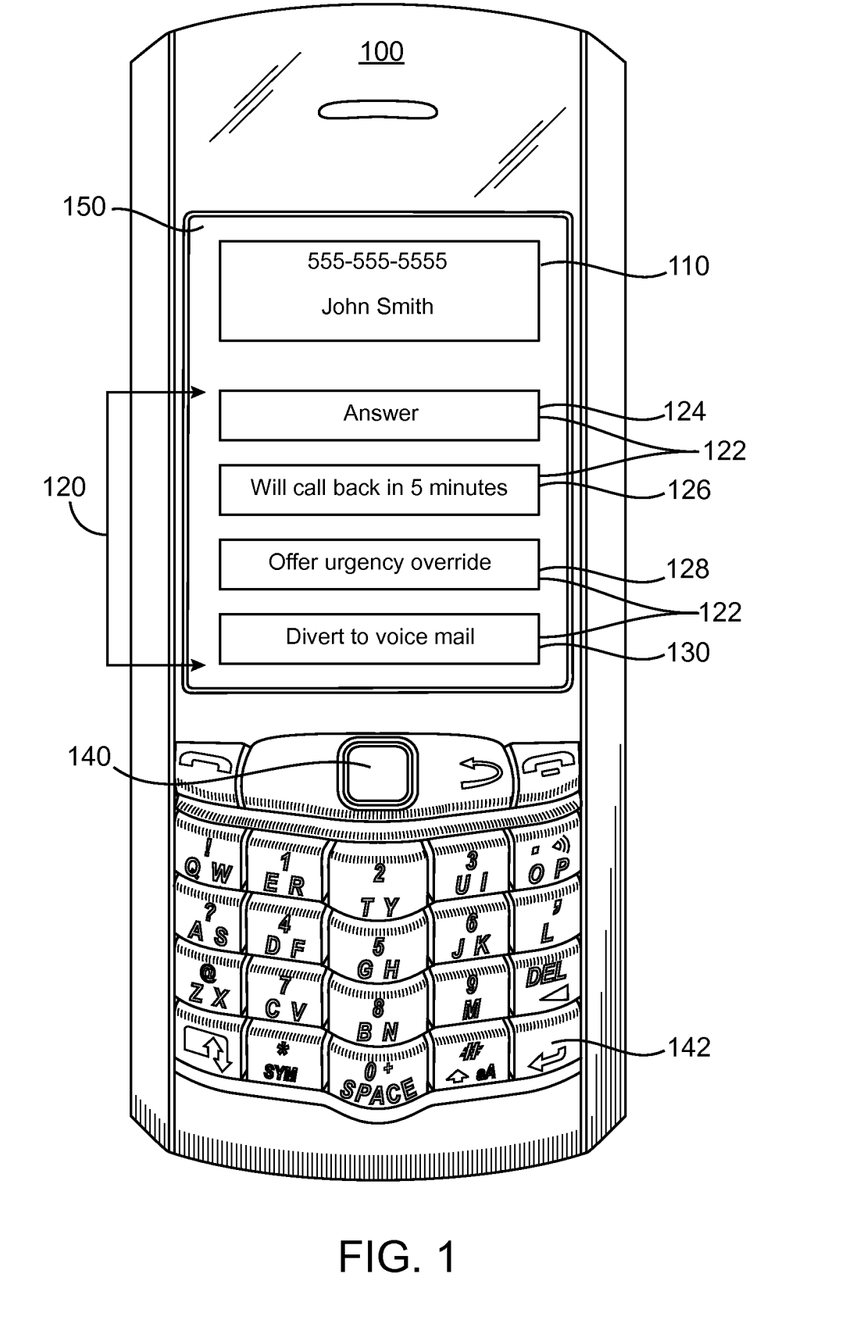
FIG. 1 illustrates an electronic device receiving a phone call while in a normal mode in accordance with an exemplary embodiment.

FIG. 1 illustrates an electronic device receiving a phone call while in a normal mode in accordance with an exemplary embodiment. The device 100 can be configured to receive calls within an operating environment such as set forth in U.S. patent application Ser. No. 13/343,577, filed Jan. 4, 2012, which is entirely incorporated by reference herein. As will be explained in greater detail below, an electronic device 100 can have a normal mode in which a call placed to the device 100 causes a group 120 of selectable command-images 122, such as those illustrated, to appear on the device 100 display. In the normal or regular mode the electronic device 100 prompts a user to manage an incoming call. When a call is received by the device 100 in normal mode, information 110 about the caller is displayed on the display 150. The device 100 can be used to answer the call by selecting the answer-call command-image 124. The answer-call command-image 124 can be selected by touching a touch-sensitive display 150 in the area of the displayed image, by scrolling a cursor or other indicator of target selection to the selected command-image using a navigation tool 140, or by other suitable means, such as by actuation of a button 142. Instead of answering the call, the device 100 can be used to send a message to the caller that the incoming call will be returned within an adjustable amount of time by selection of the call-back command-image 126. Also when a call is received during normal mode, the device 100 can display an urgency-override command-image 128. Selection of the urgency-override command-image 128 can cause the device 100 to send a message to a caller indicating that the user of the called device 100 is busy and providing the caller with the option of either leaving a message or prompting the called party to answer the call.

In some embodiments of this disclosure, the length of time indicated for returning an incoming call can be adjustable by the selection of appropriate inputs on the device 100. Thus a user of a device 100 can, for example, send a message that a call will be returned within five minutes, as illustrated in FIG. 1, or that a call will be returned within a different length of time.

Figure 2:
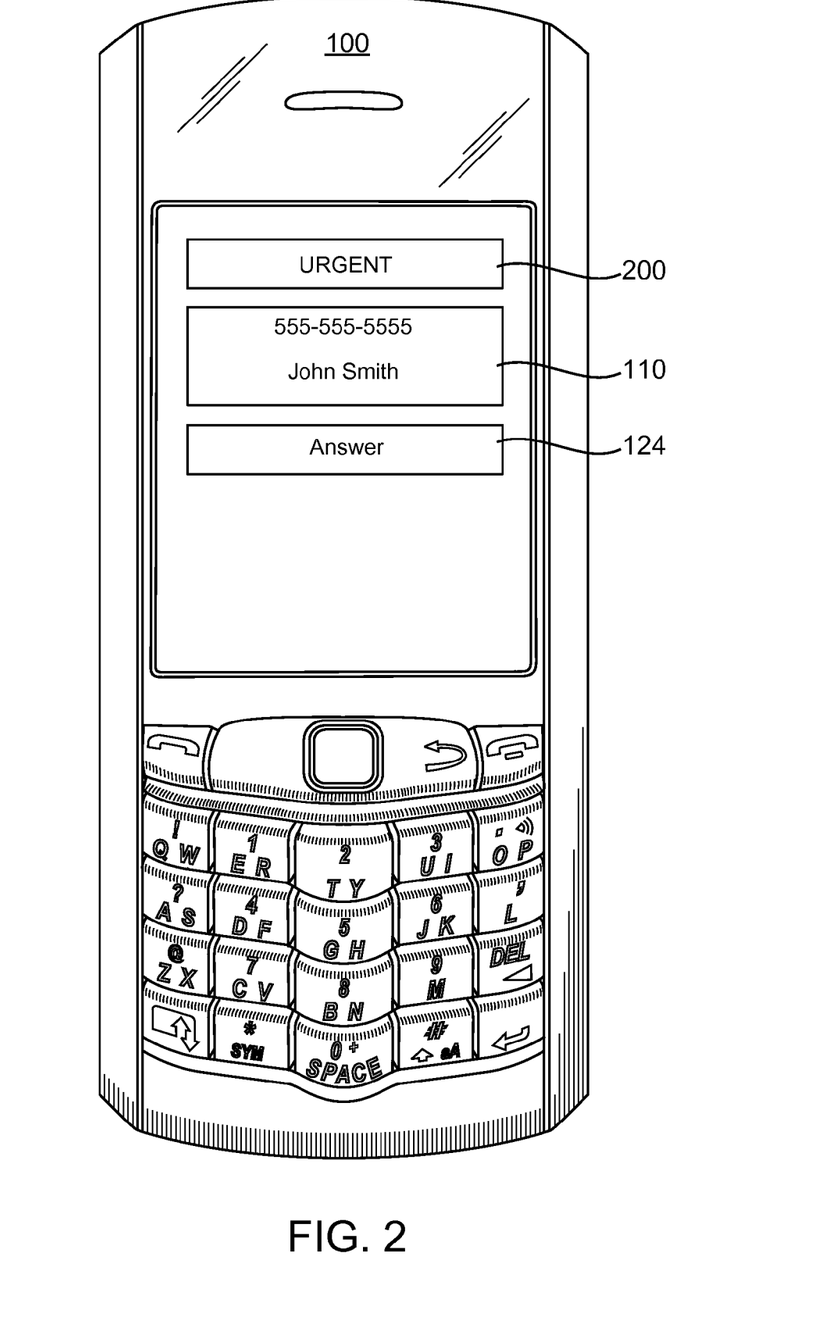
FIG. 2 illustrates an electronic device receiving an urgent phone call while in a meeting mode in accordance with an exemplary embodiment.

FIG. 2 illustrates an electronic device 100 receiving an urgent phone call while in a meeting mode in accordance with an exemplary embodiment. When the device 100 is set to meeting mode, when a call is received by the device 100, instead of immediately prompting the device-user to respond, the device 100 can send a message to a caller indicating that the user of the called device 100 is busy. The device 100 can then provide the caller with the option of either leaving a message or prompting the called party to answer the call. When a caller elects to prompt the device-user immediately, the device 100 can display information and selectable command-images as illustrated in FIG. 2. The device 100 can be configured to display a message 200 indicating that the call is urgent. The device 100 can further be configured to display information 110 about the urgent caller. The device 100 can also be configured to display suitable selectable command-images such as an answer-call command-image 124 as explained above with regard to FIG. 1.

As will be explained in additional detail below, in some embodiments within this disclosure, the device 100 can be configured to store a user-defined list of one or more numbers which will be offered an urgency-override option according to adjustable settings. For example, a first list of numbers could be urgency-override enabled during certain time periods, such as co-workers during business hours, whereas another list might contain numbers of potential callers who will always be offered an urgency-override option, such as a device-user's spouse or immediate supervisor. It will be understood that other suitable settings are possible.

Figure 3:
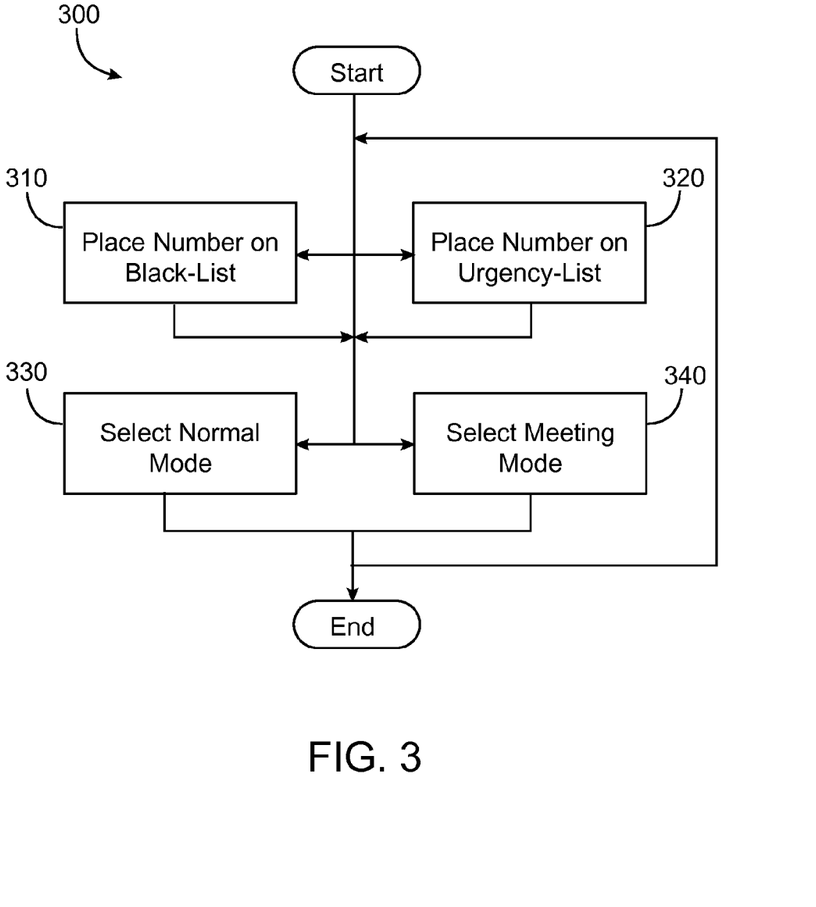
FIG. 3 illustrates a method of changing call management settings of an electronic device in accordance with an exemplary embodiment.

FIG. 3 illustrates a method of changing call management settings of an electronic device 100 in accordance with an exemplary embodiment. The method 300 illustrated in FIG. 3 is provided by way of example, as there are a variety of ways to carry out the method. Additionally, while the exemplary method 300 is illustrated with a particular order of steps, those of ordinary skill in the art will appreciate that FIG. 3 and the steps illustrated therein can be executed in any order that accomplishes the technical advantages of the present disclosure and can include fewer or more steps than illustrated. Furthermore, the exemplary method 300 can be combined with the method shown in FIG. 4, as will be explained below.

Each block shown in FIG. 3 represents one or more processes, methods or subroutines, carried out in exemplary method 300. In FIG. 3, the method 300 can begin at block 310. When the method 300 starts at block 310 a device 100 can be configured to ignore calls from an input telephone number or otherwise identified external device. A group or list of numbers that are designated to be ignored can be known as a black-list. As illustrated in FIG. 300, after a number is added to a black-list, other steps (320, 330, 340) can be performed, or an additional number can be added to the black-list at block 310. After a number has been placed on the blacklist, the method can proceed to block 320. At block 320, a number can be authorized to be provided with urgency-override options. As discussed above with respect to FIG. 2, a device 100 can be configured with various adjustable urgency-override settings; thus numbers on a first urgency-list can have urgency-override authorization during certain periods while another urgency-list can have urgency-override authorization during other periods. Once a number has been added to an urgency-authorized list at block 320, the method 300 can continue to blocks 310, 330 or 340, or another number can be added to the urgency-authorized list at block 320. At block 330, the device 100 can be placed in normal mode. As discussed above and as will be explained in greater detail below, when the device 100 receives a call and the device 100 is in a normal mode, the device 100 can prompt a called party and can display information 110 and can display selectable command images 122 as discussed with regard to FIG. 1. It is possible within this disclosure that a device 100 can be configured such that a normal mode is a default mode of the device. In other words, the device 100 can be configured such that, absent input commands to place the device 100 in a meeting mode, the device will be in a normal mode when turned on. Once the device 100 has been placed in normal mode, the method 300 can proceed to block 310, 320 or 340. At block 340 the device can be placed in a meeting mode. When the device 100 is in a meeting mode, authorized callers can be provided with the ability to contact the device 100 immediately or leave a message or take other suitable action.

Figure 4:
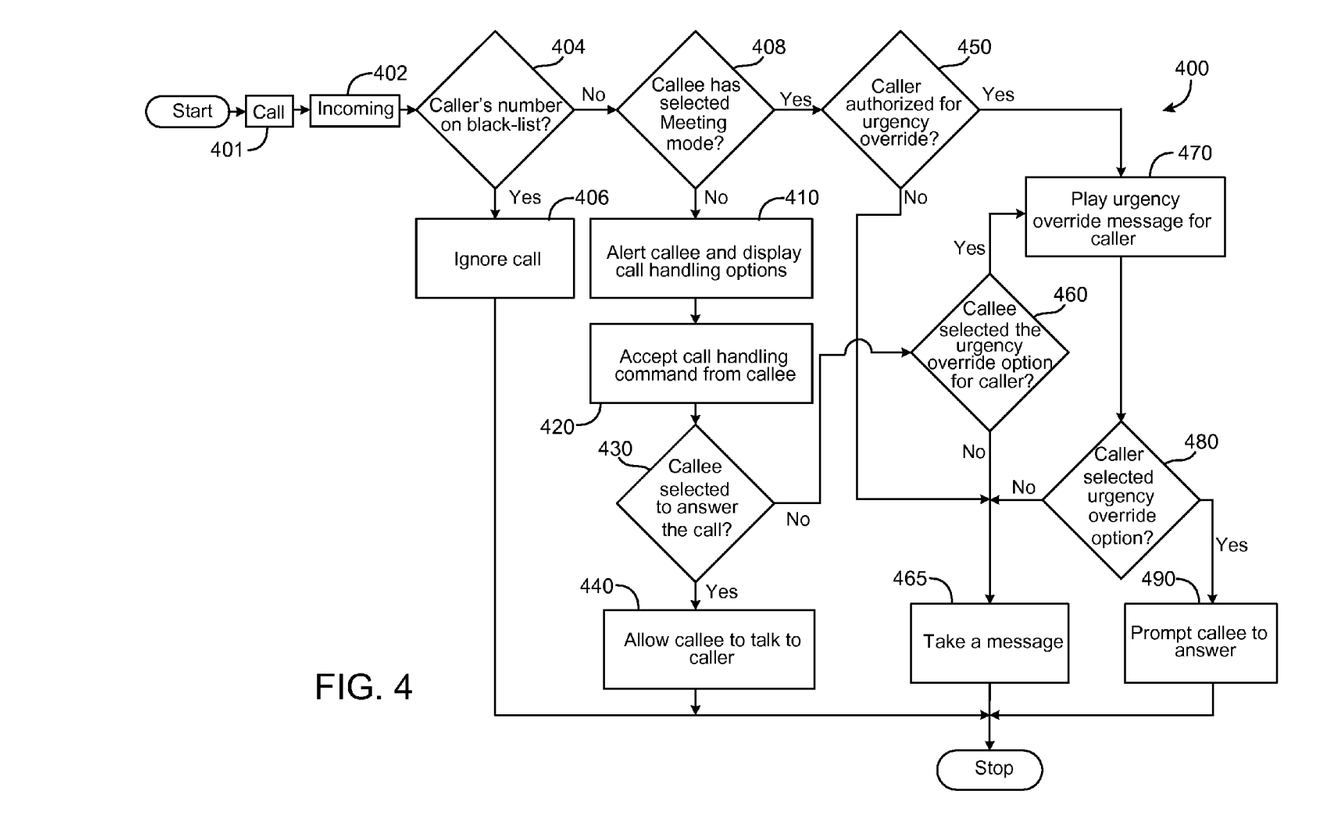
FIG. 4 illustrates a method of managing a call to an electronic device in accordance with an exemplary embodiment.

FIG. 4 illustrates a method 400 of managing an incoming call 401 to an electronic device 100 in accordance with an exemplary embodiment. It will be understood that additional steps may be performed or that some of the steps illustrated may be combined without departing from this disclosure. At block 402 an incoming call 401 is received by the device 100. The method 400 then proceeds to block 404. At block 404, the number of the incoming call 401 is compared with a black-list. If the number which generated the incoming call 401 is on the black-list, the method will continue to block 406 and the call will be ignored. If the call 401 is ignored, the device 100 can be configured such that it takes no further action with regard to the call 401. If the number corresponding to the incoming call 401 is not on the black-list, the method 400 can then proceed to block 408. At block 408 an evaluation is made as to whether or not the device 100 is in a meeting mode. If the device 100 is in a meeting mode, the method can continue to block 450. If the device 100 is not in a meeting mode, the method 400 can continue to block 410.

At block 410 of the method 400, the device 100 can display the information 110 and selectable command-images 122 as discussed above with respect to FIG. 1. If a displayed command-image 122 is selected, the device 100 can then proceed to block 420, in which the device 100 accepts the selected call-handling command. The method can then proceed to block 430. At block 430 a determination is made as to whether the selected command was to answer the call. If the command was to answer the call, the method 400 proceeds to block 440 at which point the called device 100 and the device which placed the call 401 can be connected for two-way voice communication. If, at block 430, the selected command was not to answer the call, the method can then proceed to block 460. At block 460 a determination is made as to whether the urgency-override command 128 was selected in block 420. If the urgency-override command 128 was not selected, the method can proceed to block 465 at which point the caller who placed the call 401 can record a message for subsequent retrieval and playback by the callee. If the urgency-override command 128 was selected, the method can continue to block 470 at which urgency-override procures begin as will be discussed in greater detail below.

As discussed above when a call 401 is received from a non-blacklisted number, an evaluation is made as to whether or not the device 100 is in a meeting mode at block 408. If the device 100 is in a meeting mode, the method can continue to block 450. At block 450, a determination is made as to whether the number which placed the call 401 has been authorized to receive an urgency-override option. If the number corresponding to the incoming call 401 is not on an urgency-list, the method will continue to block 465, at which point the device 100 will enable the caller which placed the call 401 to leave a message. If the number which placed the incoming call 401 is on an urgency-list (i.e., the caller is authorized for urgency-override) the method can continue to block 470 at which urgency-override procedures begin.

Urgency-Override Procedures

At block 470, a message is played to the caller, either because the called party selected the urgency-override command 128 or because the call 401 was received from an urgency-authorized caller while the device 100 was in a meeting mode or other such restricted access mode. The message which is played is that the called party has placed the device 100 in a restricted mode and that the caller can choose to contact the called party immediately or to record a message for later retrieval and playback. Once the message is played, the method can proceed to block 480, at which point the caller can make an input corresponding to a desire to leave a message at block 465 or corresponding to contact the called device 100 immediately at block 490. In some embodiments within this disclosure, if the caller elects to record a message, the recorded message can be stored locally to the device 100. In other embodiments within this disclosure, the recorded message can be stored externally to the device 100.

Figure 5:
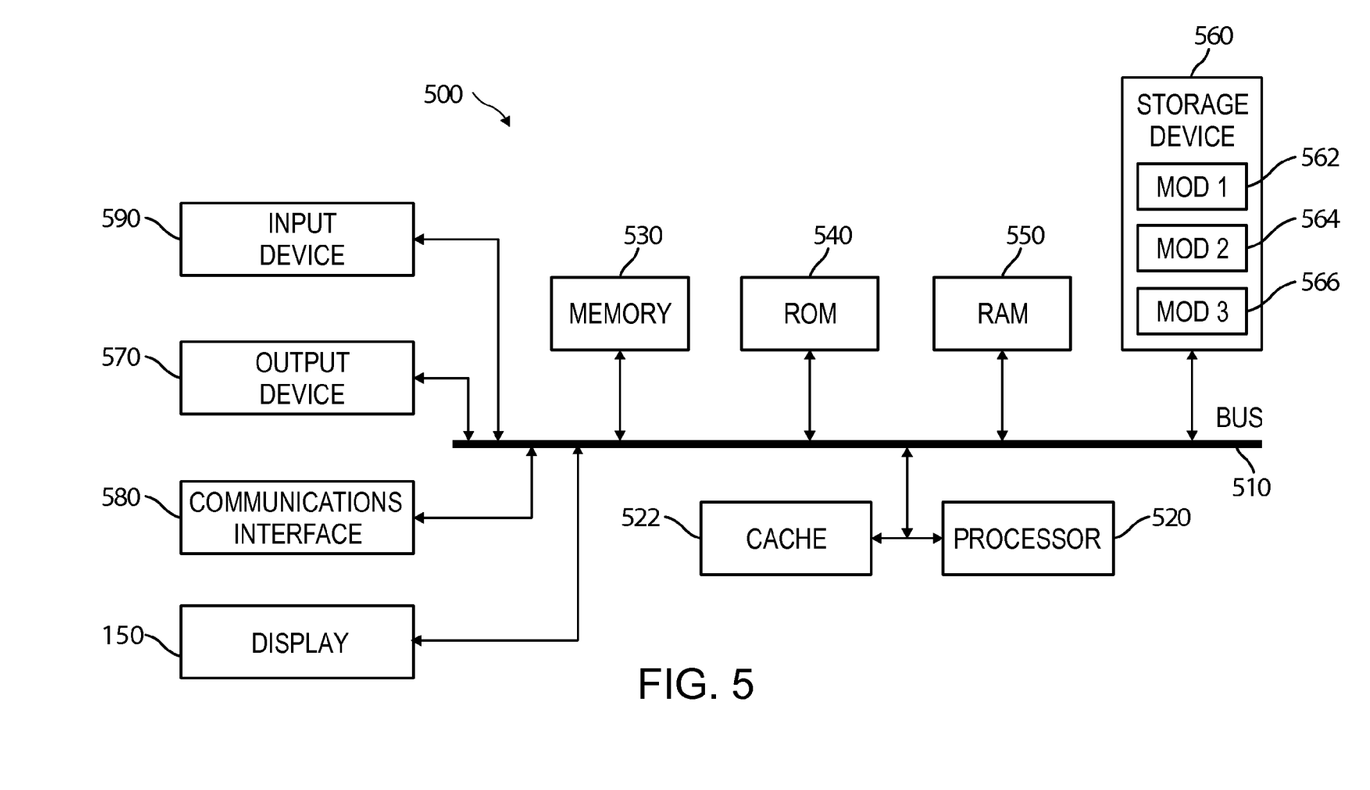
FIG. 5 illustrates an electronic device in accordance with an exemplary embodiment.

The disclosure now turns to a brief description of an electronic device 500 (e.g., 100), as shown in FIG. 5, which can be employed to practice the concepts is disclosed herein. The components disclosed herein can be incorporated in whole or in part into electronic devices such as smart-phones, computers, personal computers, handsets, and any other electronic or other computing device capable of receiving and send sending voice communications.

With reference to FIG. 5, an exemplary electronic device 500 (e.g., 100) includes a processing unit (CPU or processor) 520 and a system bus 510 that couples various system components including the system memory 530 such as read only memory (ROM) 540 and random access memory (RAM) 550 to the processor 520. The device 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on an electronic device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output system (BIOS) stored in ROM 540 or the like, may provide the basic routine that helps to transfer information between elements within the electronic device 500 (e.g., 100), such as during start-up. The device 500 can include storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer readable storage media provide nonvolatile storage of computer readable instructions, data structures, program modules and other data for the electronic device 500. In one aspect, a hardware module that performs a particular function includes the software component stored in a non-transitory computer-readable medium in connection with the necessary hardware components, such as the processor 520, bus 510, display 150, and so forth, to carry out the function. The basic components are known to those of skill in the art and appropriate variations are contemplated depending on the type of device, such as whether the device 500 is a small, handheld computing device, a desktop computer, or a computer server.

It should be appreciated that various types of computer readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may be used within this disclosure. Non-transitory computer-readable storage media expressly exclude media such as energy, carrier signals, electromagnetic waves, and signals per se.

To enable user interaction with the electronic device 500, an input device 590 (e.g., 140, 142) represents any number of input mechanisms, such as a microphone for speech, a touch-sensitive screen for gesture or graphical input, keyboard, mouse, motion input, speech and so forth. An output device 570 can also be a display 150, a speaker or other suitable output mechanism. In some instances, multimodal systems can enable a user to provide multiple types of input to communicate with the electronic device 500. The communications interface 580 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 5 is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. Such logical operations can be implemented as modules configured to control the processor 520 to perform particular functions according to the programming of the module. For example, FIG. 5 illustrates three modules Mod 1 562, Mod 2 564 and Mod 3 566 which are modules configured to control the processor 520. These modules may be stored on the storage device 560 and loaded into RAM 550 or memory 530 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including smart-phones, personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to smart-phones device but to other devices capable of receiving voice communications such as a laptop computer. It will be understood that various modifications and changes can be made to the disclosed embodiments according to the principles described herein without departing from the scope of the disclosure and the appended claims.

The invention claimed is:

1. An electronic device configured to receive and send calls, the electronic device comprising:
    a display;
    a processor communicatively coupled to the display, the processor configured to execute instructions to cause the electronic device to:
        operate in a first mode to:
            render caller information and a plurality of command-images on the display when a call is received, the plurality of command-images including an answer command to answer the received call, a call-back command to send a message that the call will be returned within a predetermined amount of time, and an override command to offer an urgency-override;
            upon activation of the call-back command, prompt a caller to record a message; and
            upon activation of the override command, prompt the caller to record a message or request the callee to answer the call; and
        operate in a second mode to:
            automatically direct all calls to voicemail except calls received from callers of a specific characterization; and
            automatically offer the urgency-override for callers of the specific characterization.

2. The electronic device of claim 1, wherein the plurality of command-images further comprises a command-image which corresponds to a divert command to divert the received call to voice mail.

3. The electronic device of claim 1, wherein the processor further includes instructions to block a call from a selected number.

4. The device of claim 1, wherein the message is stored locally to the electronic device.

5. A method of managing calls to an electronic device configured to receive and send calls, the method comprising:
    operating in a first mode to:
        render caller information and a plurality of command-images when a call is received by the device, the plurality of command-images including an answer command to answer the received call, a call-back command to send a message that the call will be returned within a predetermined amount of time, and an override command to offer an urgency-override;
        upon activation of the call-back command, prompt a caller to record a message; and
        upon activation of the override command, prompt the caller to record a message or request the callee to answer the call; and
    operating in a second mode to:
        automatically directs all calls to voicemail except calls received from callers of a specific characterization; and
        automatically offer the urgency-override for callers of the specific characterization.

6. The method of claim 5, wherein the plurality of command-images further comprises a command-image which corresponds to a divert command to divert the received call to voice mail.

7. The method of claim 5, wherein the first mode and the second mode are further configured to block a call from a selected number.

8. The method of claim 5, wherein the message is stored locally to the electronic device.

9. A non-transitory computer-readable storage medium storing instructions which, when executed by a processor, cause an electronic device having a display to:
   operate in a first mode to:
      render caller information and a plurality of command-images on the display when a call is received, the plurality of command-images including an answer command to answer the received call, a call-back command to send a message that the call will be returned within a predetermined amount of time, and an override command to offer an urgency-override;
      upon activation of the call-back command, prompt a caller to record a message; and
      upon activation of the override command, prompt the caller to record a message or request the callee to answer the call; and
   operate in a second mode to:
      automatically direct all calls to voicemail except calls received from callers of a specific characterization; and
      automatically offer the urgency-override for callers of the specific characterization.

10. The non-transitory computer-readable storage medium of claim 9, wherein the plurality of command-images further comprises a command-image which corresponds to a divert command to divert the received call to voice mail.

11. The non-transitory computer-readable storage medium of claim 9, further storing instructions which, when executed by the processor, cause the electronic device to offer the urgency-override when the call is received from a selected number.

12. The non-transitory computer-readable storage medium of claim 9, wherein the message is stored locally to the electronic device.

13. The non-transitory computer-readable storage medium of claim 9, wherein the first mode and the second mode are further configured to block a call from a selected number.

14. The electronic device of claim 1, wherein the processor further includes instructions to offer the urgency-override option when the call is received from a selected number.

15. The method of claim 5, wherein the second mode is configured to offer the urgency-override option when the call is received from a selected number.

\* \* \* \* \*